United States Patent
Kranz

(10) Patent No.: US 8,352,210 B2
(45) Date of Patent: Jan. 8, 2013

(54) MULTIPLE ACCELEROMETER APPARATUS FOR COUNTING ROTATIONS OF AN OBJECT, AND METHODS OF USE

(75) Inventor: Mark J. Kranz, Hallsville, TX (US)

(73) Assignee: Stemco LP, Longview, TX (US)

( * ) Notice: Subject to any disclaimer, the term of this patent is extended or adjusted under 35 U.S.C. 154(b) by 192 days.

(21) Appl. No.: 12/842,446

(22) Filed: Jul. 23, 2010

(65) Prior Publication Data

US 2011/0066397 A1 Mar. 17, 2011

Related U.S. Application Data

(60) Provisional application No. 61/227,785, filed on Jul. 23, 2009.

(51) Int. Cl.
*G01C 21/00* (2006.01)
(52) U.S. Cl. ........................................ 702/141; 702/158
(58) Field of Classification Search ................ 702/33, 702/141, 142, 145, 146, 148–153, 155, 158, 702/165; 73/1.37, 862.192, 488, 504.03, 73/514.02; 377/23, 24.1, 15
See application file for complete search history.

(56) References Cited

U.S. PATENT DOCUMENTS

| | | | |
|---|---|---|---|
| 6,011,827 A * | 1/2000 | Kyrtsos | 377/24.1 |
| 6,466,887 B1 | 10/2002 | Weinbrenner | |
| 6,547,128 B1 * | 4/2003 | Shimura | 235/95 B |
| 6,646,432 B1 * | 11/2003 | Malinowski | 324/171 |
| 2003/0226698 A1 | 12/2003 | Kamen et al. | |
| 2004/0083811 A1 | 5/2004 | Kranz | |
| 2006/0006991 A1 | 1/2006 | Tyndall et al. | |
| 2006/0087420 A1 | 4/2006 | Walraet | |

OTHER PUBLICATIONS

International Searching Authority, "Notification of Transmittal of the International Search Report and the Written Opinion of the International Searching Authority, or the Declaration," Sep. 1, 2010.

* cited by examiner

*Primary Examiner* — Sujoy Kundu
(74) *Attorney, Agent, or Firm* — Holland & Hart LLP

(57) ABSTRACT

A system determines the revolutions of an object using multiple accelerometers. A difference vector between at least 2 multi-axis accelerometers spaced some distance apart is used to calculate the two-dimensional or three-dimensional centripetal acceleration vector. The centripetal acceleration vector is then used as a rough estimate for the sampling rate for a digital tracking bandpass filter. This bandpass filter extracts angular orientation data leading to a sampling rate and to a revolution totalizer. The number of revolutions of the object, along with a known diameter of an attached object, such as a vehicle wheel, may be used to calculate distance traveled by the object.

17 Claims, 6 Drawing Sheets

MULTIPLE ACCELEROMETER APPARATUS FOR COUNTING ROTATIONS OF AN OBJECT, AND METHODS OF USE

CROSS REFERENCE TO RELATED APPLICATIONS

This application claims priority to U.S. Provisional Patent Application No. 61/227,785, filed on Jul. 23, 2009, the entire disclosure of which is incorporated herein by reference.

FIELD

This invention relates to methods and systems for counting rotations of an object. More particularly, this invention relates to electronic rotation sensors having multiple sensors capable of counting rotations of an object that may be rotating about more than one axis of rotation.

BACKGROUND

The ability to determine rotations of an object is useful for numerous different applications. For example, fleet maintenance agreements, leasing agreements and/or certain governmental regulations often require the use of a device to accurately record the distance traveled by a commercial vehicle. One device, commonly known as a hubodometer, is typically bolted or otherwise attached to a wheel hub of the vehicle where it senses rotation of the wheel, the sensed rotation being correlated with distance traveled. Such distance information may be used, for example, for determining highway usage fees as well as for compliance with contractual agreements. Given the potentially costly outcome of inaccurate measurements, it is important that the recording device be manufactured in a manner which prevents intentional or inadvertent alteration of the distance information. It is also important that the recording device not be sensitive to transient movements or vibrations of the device such that such movements are not interpreted as a rotation of the wheel hub.

Traditional solutions to this problem have included using a weighted mechanical assembly that sits along the rotating axis of a wheel. As the wheel turns, the weighted assembly stays stationary. This provides a relative motion that can drive a geared odometer. The problems with this method are that vibration can induce spin into the weighted assembly which makes the unit stop counting since there is no longer any relative motion with respect to the wheel to turn the internal gears. This forces the unit to inherently undercount over time. Another limitation to this method is that every wheel needs different parts and gears so that mileage is displayed correctly on different wheel sizes. Not all wheel sizes can be supported in this manner though. A further limitation relates to the effect of wheel impacts when driving over rough surfaces or rocks. These impacts can impart inaccuracies into the odometer count.

Prior electronic hubodometers are known, such as described in U.S. Pat. No. 6,940,940, entitled "Electronic Hubodometer" and issued on Sep. 6, 2005, the entire disclosure of which is incorporated herein by reference. In this disclosure, a hubodometer is provided with a single accelerometer that is operable to sense a force acting thereon and generate an electrical signal representative of said force. Further an electronic control system is provided comprising a microcontroller and power source, the microcontroller comprising electronic filtering means for attenuating irregularities in the signal from the sensor means and computing a wheel revolution count based on said attenuated signal, and output means for communicating the wheel revolution count. The accelerometer preferably comprises a dual axis electronic accelerometer with no internally rotating parts. Further, the output means preferably comprises at least one of a display means, an IR communication system, and/or a RF communications system.

SUMMARY

The present disclosure provides a system that determines the revolutions of an object using multiple accelerometers. A difference vector between at least 2 multi-axis accelerometers spaced some distance apart is used to calculate the two-dimensional or three-dimensional centripetal acceleration vector. The centripetal acceleration vector is then used as a rough estimate for the sampling rate for a digital tracking bandpass filter. This bandpass filter extracts angular orientation data leading to a sampling rate and to a revolution totalizer. The number of revolutions of the object, along with a known diameter of an attached object, such as a vehicle wheel, may be used to calculate distance traveled by the object.

One aspect of the present disclosure provides a wheel-hub mountable odometer comprising: (a) a housing that is adapted to be coupled to a wheel of a vehicle; (b) at least a first accelerometer and a second accelerometer mounted within said housing that each sense a force acting thereon and generate an electrical signal representative of said sensed force, said first accelerometer mounted at a first distance from said second accelerometer; (c) a controller mounted within said housing that is interconnected to said accelerometers that (i) receives electrical signals representative of said sensed forces acting on each accelerometer, and (ii) calculates wheel rotations based on the electrical signals and said first distance; and (d) a power source mounted within said housing that provides operating power to said accelerometers and said controller. Each accelerometer may comprise a dual axis accelerometer capable of sensing force along two axes, or a three axis accelerometer capable of sensing force along three axes. The first distance and sensed forces are processed by said controller to determine centripetal acceleration that is used to calculate wheel rotations, and the controller calculates angular rate of change based on the centripetal acceleration. In one embodiment, the controller comprises electronic filters that include (i) an adaptive frequency filter that removes centripetal acceleration signals outside of an adaptive frequency range that is calculated through the use of a digital phase locked loop, and a bandpass filter attenuates irregularities in the calculated centripetal acceleration signal due to wheel impacts. The odometer may further comprise a display in communication with said controller.

In one embodiment, an odometer communications system comprising an odometer of the present disclosure may be coupled to a communication system operable to communicate odometer information to a remote location. The communication system comprises an RF communication system. The RF communication system may include an RF tag in communication with the controller of the odometer that transmits information related to wheel revolutions when a signal is received from an interrogator remote from said odometer.

Another embodiment of the present disclosure provides a method for counting wheel revolutions comprising: (a) attaching an electronic odometer to a wheel, the odometer comprising at least two accelerometers and a controller that receives signals from said accelerometers, the signals proportional to a sensed force acting on said accelerometers, (b) converting said accelerometer signals into centripetal acceleration; and (c) calculating a wheel revolution count based on said centripetal acceleration. The accelerometers may comprise dual axis electronic accelerometers that sense force along the two axes and generate electrical signals proportional to the sensed forces. The converting, in an embodiment comprises: (a) receiving, at said controller, signals from each accelerometer; (b) calculating a centripetal acceleration for said odometer based on said signals and based on a distance between said accelerometers; (c) calculating an angular rate of change based on said centripetal acceleration; and (d) calculating wheel revolutions based on said angular rate of change. Converting may also include setting a frequency of an adaptive frequency filter based on said angular rate of change, and may also include filtering out irregularities in the centripetal acceleration signal through a bandpass filter.

One feature and advantage of the present invention is a more accurate odometer, which is less susceptible to miscounts due to vibration and road impacts. The data filtering and reconstruction techniques of the present disclosure enhance the accuracy of the odometer over prior art devices. It is a further feature and advantage of the present invention to provide an electronic hubodometer that can self-correct for impacts and vibrations felt by the wheel. Aspects of the disclosure may also provide a sensor for counting nonplane rotations, such as rotations of a ball, may be used in high and low rotation rate systems, may have wireless data access, and have enhanced low power techniques so that batteries never have to be replaced.

DETAILED DESCRIPTION

Figure 1:
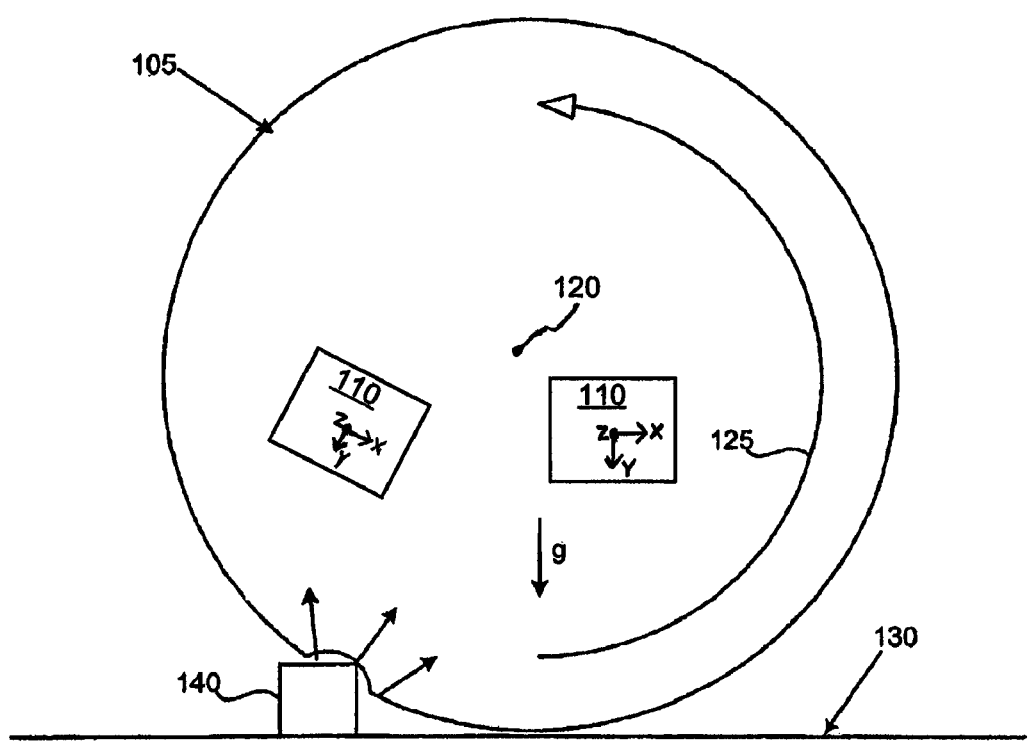
FIG. 1 is a functional block diagram illustration of a rotation detection device having multiple accelerometers.

The present disclosure recognizes that it would be beneficial to have an electronic hubodometer with no moving internal parts, capable of accurately tracking mileage while minimizing distortions due to wheel impacts and vibrations at both relatively high and low rotational rates. It would be further beneficial to monitor hubodometer data from a location remote from the wheel, such as from inside the passenger compartment of the vehicle; from a hand held monitor; or from a building proximate to where the vehicle is stored. When working with a fleet of vehicles, it would further be beneficial to provide hubodometer information on a network where it is accessible from a plurality of locations. These include the Internet and cellular or satellite monitoring systems.

In a first aspect of the present invention, an electronic hubodometer is provided comprising a dual axis accelerometer mounted to a wheel hub. In further embodiments of the present invention, electronic components including a microcontroller and communication system means are provided to interpret the accelerometer signal, calculate odometer information, and communicate the data to a remote location.

In an embodiment of the present invention, the accelerometer and electronic components of this system comprise a solid state system with no moving parts. Therefore, the product size is dictated only by the size of the display needed to read the mileage. This allows freedom in design of the surrounding enclosures, leading to a potential for cost reductions in the unit since one unit can work with all wheel sizes using the same components.

The odometer enclosure comprises two main components, a back-cup and front cover. The majority of wheel-mounted odometers utilize a back-cup made from metal with a plastic front cover. Methods for closure or assembly of the housing components include swaging, snapping, and using an external clamp. Preferably, the enclosure is designed to keep out moisture, such as by using a seal in conjunction with any connection points.

One embodiment of the present invention comprises a plastic back-cup with an insert-molded stud. The insert is designed to react to external loads including rotation, bending, and axial thrust. The design of the back-cup also allows for sufficient internal cavity space for the electronic components. While the back-cup is designed with strength in mind, it also contains features to limit battery movement and possible disconnection. The printed circuit board (PCB) is supported by the tops of strengthening ribs and sandwiched between the back-cup and front cover to lock it tightly in place. The front cover is held in place through ultrasonic welding to the back-cup. This provides a solid unit that eliminates the need for mechanical fastening of the PCB to any other component separately, and further creates a hermetic seal between the back-cup and front cover without the need of other sealing components.

Accelerometers come in many varieties including piezoelectric accelerometers which use piezoelectric crystals to produce an electric charge when a force is exerted under acceleration; a potentiometric accelerometer which uses displacement of a spring and mass linked to a wiper arm which moves across a potentiometer; a reductive accelerometer which uses an inductance bridge to produce an output voltage proportional to the movement of a mass by causing the inductances of two coils to vary in opposing directions; a strain gauge accelerometer, or piezoresistive accelerometer which uses strain gauges acting as arms of a Whetstone bridge to convert mechanical strain to DC voltage; a capacitive accelerometer in which a change in acceleration causes a change in the space between a moving and a fixed electrode; and a vibrating element accelerometer in which a small displacement of the mass varies the tension of a tungsten wire in a permanent magnetic field and current through the wire causes the wire to vibrate at a resonant frequency.

All accelerometers share the characteristic of measuring a force in a given direction. Positive accelerometer readings are indicative of a force applied in the direction of orientation of the accelerometer. Negative accelerometer readings are indicative of a force applied directly opposite or offset 180 degrees from the direction of orientation of the accelerometer. In one embodiment of the present disclosure, the accelerometer comprises a device capable of measuring a force applied thereto, with no internal moving parts.

In one embodiment, the accelerometer sensor comprises a surface micromachined polysilicon structure built on top of the silicon wafer. Polysilicon springs suspend the structure over the surface of the wafer and provide a resistance against acceleration forces. Deflection of the structure is measured using a differential capacitor that consists of independent fixed plates and central plates attached to the moving mass. The fixed plates are driven by 180 degree out of phase square waves. An acceleration will deflect the beam and unbalance the differential capacitor, resulting in an output square wave whose amplitude is proportional to acceleration being imparted on the structure. Phase sensitive demodulation techniques are then used to rectify the signal and determine the direction of the acceleration.

In an embodiment, the accelerometer comprises two or more three-axis accelerometers. Three axis accelerometers have sensors and measure force along three axes, whereas two-axis accelerometers measure force along two axes. In an alternate embodiment, force is detected along multiple axes by mounting multiple unidirectional accelerometers on a differing axis. The three axes of measurement comprise any three directional vectors separated by an angle other than 180 degrees or 360 degrees. At an angle of separation comprising 180 degrees two detectors would measure the same force, but in opposite directions. Similarly, a separation angle of 360 degrees would result in duplicative data. In one embodiment, the angle of separation is 90 degrees, or similarly 270 degrees relative to each axis. This angle of separation is preferred as it simplifies calculations and represents the greatest offset between the readings. This increases the accuracy of each of the accelerometer measurements, and the accuracy of estimating missing data points when the accelerometer produces erratic signals due to large road impacts. For the purposes of simplification of this discussion, the three axis accelerometers will be referenced including three detectors offset by an angle of 90 degrees.

Referring to FIG. 1, two three axis accelerometers 110 are placed on a mileage counting device which may be affixed to a wheel 105 of a vehicle. In this embodiment, each accelerometer 110 is placed approximately 1 cm away from the centerpoint 120 of the device. The accelerometers detect force along three axes, an x-axis, a y-axis, and a z-axis, which are each offset from by 90 degrees. As the wheel 105 rotates in a direction shown by the arrow 125, the orientation of the x-axis and y-axis will change with respect to the ground 130. Assuming a flat surface, the force of gravity (g) is felt in a direction perpendicular to the ground 130.

Figure 2:
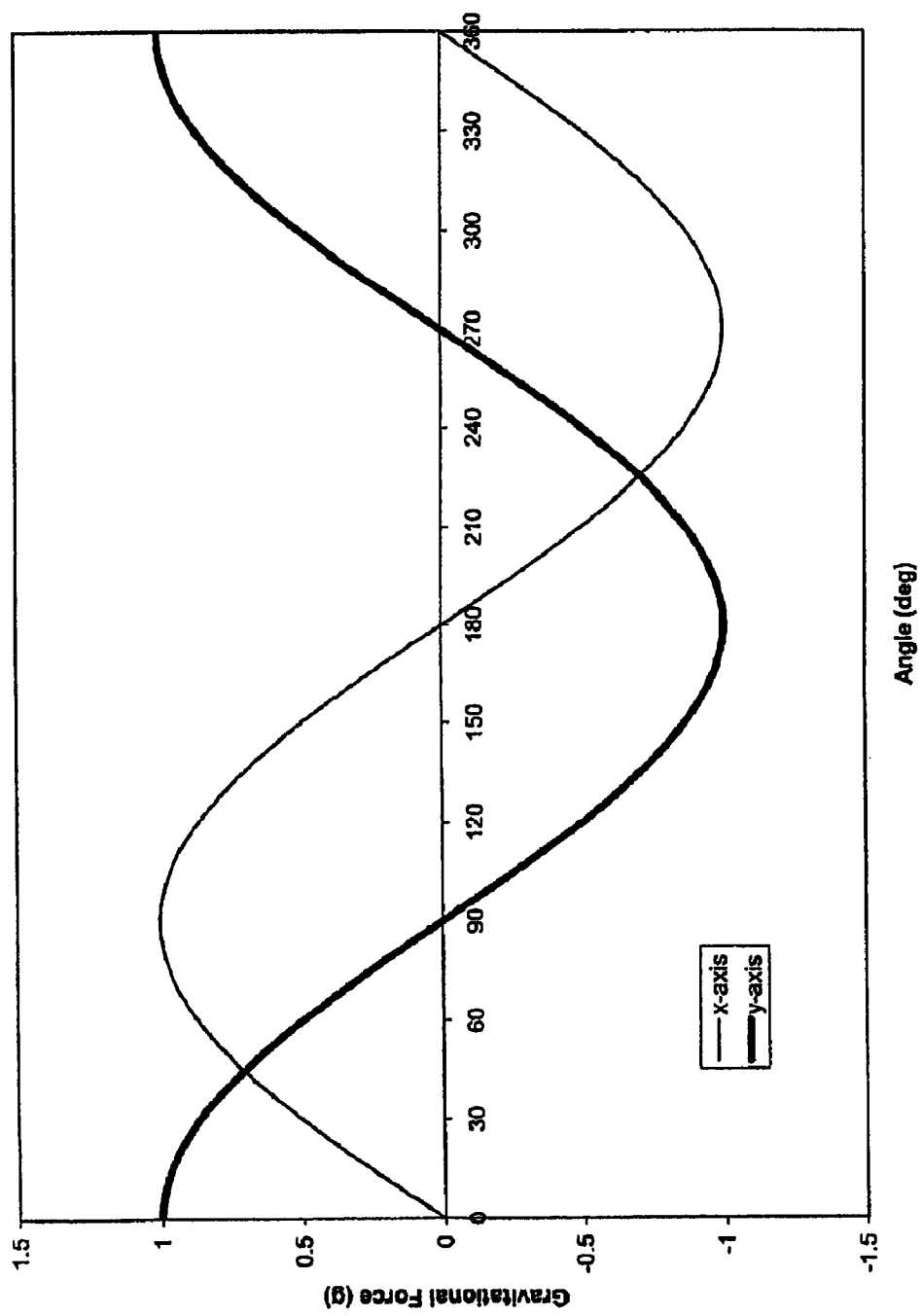
FIG. 2 is a plot of x-axis and y-axis acceleration data generated by an accelerometer mounted in the center of a wheel in an embodiment.

Before the wheel starts to turn the y-axis of the accelerometers will detect the full force of gravity (1 g), and the x-axis and z-axis will not detect any force from gravity because the force is acting on these sensors for these axes perpendicular to the direction of detection (i.e. the force has no x or z axis component). As the rotation begins in the direction indicated by the arrow 125, the accelerometers will detect decreasing values along the y-axis as the y-axis approaches an orientation perpendicular to the force of gravity. Simultaneously, the x-axis of each accelerometer will detect an increasing force of gravity in a negative direction as it approaches an orientation parallel, but opposite to, the gravitational pull. After one-quarter turn of the wheel, the x-axis is oriented directly upward and detects −1 g of force. The y-axis would be perpendicular to the direction of gravity and would detect no force. As the wheel continues to rotate, these forces continue to change resulting in a sinusoidal output from both the X and Y axes. FIG. 2 illustrates a plot of the x and y acceleration data generated by an accelerometer mounted in the center of a wheel. In the event that the mileage counting device or wheel are not oriented perpendicular to the ground, the z-axis sensor will detect acceleration due to gravity as the wheel turns.

As noted, the accelerometers 110 of FIG. 1 are not located at the center 120 of the wheel, and therefore the force felt by the x-axis and y-axis sensors will ride on a centripetal acceleration reading that will vary with radial distance from the center of the wheel. For example at a given distance "R" from the center of the wheel the accelerometer will detect a constant force "F" due to the centripetal force of the spinning wheel. This force "F" will also vary with the angular velocity of the wheel. As such, F is only constant for a given velocity.

Figure 3:
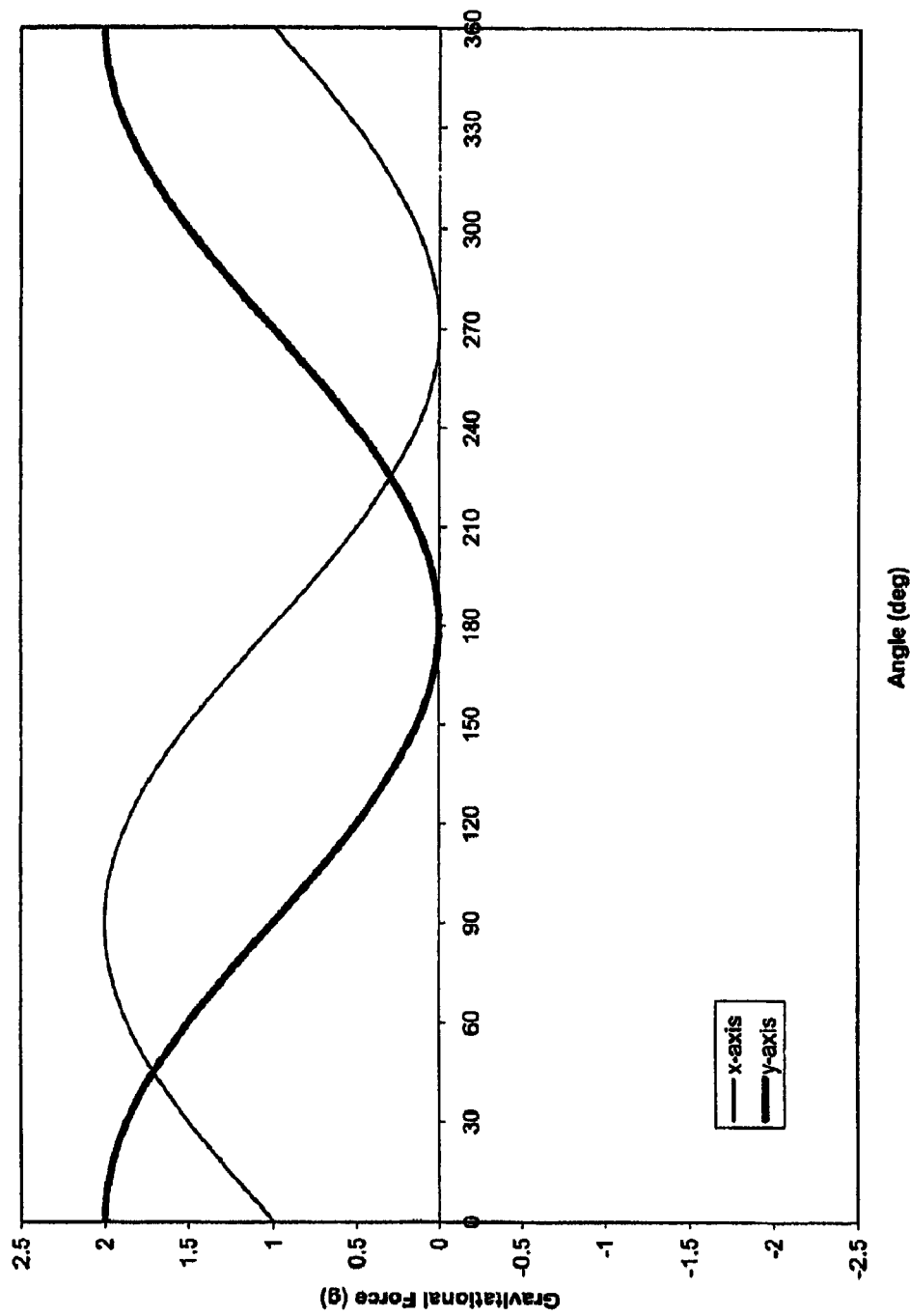
FIG. 3 is a plot of x-axis and y-axis acceleration data generated by an accelerometer mounted at a distance R from the wheel center in an embodiment.

In addition to the velocity dependant centripetal force, the offset sensors will detect the cyclical gravitational force of +/−1 g, as discussed above. Therefore, in embodiments where one or more accelerometers are mounted away from the center of the wheel, the same sinusoidal pattern will be reported by the accelerometer, and it will have "shifted" due to the centripetal acceleration experienced by the sensors. This is illustrated in the acceleration plot in FIG. 3 in which the centripetal acceleration produces a constant 1 g of force, and the force due to gravity cycles through the +/−1 sinusoidal pattern. This is, of course, assuming a constant angular velocity throughout the plot.

As mentioned above, the output of the accelerometer x-axis and y-axis sensors is a DC voltage that varies with measured force. Thus, a full rotation of the wheel is represented by a sine or cosine wave of DC voltage as output from the accelerometer. The odometer count of wheel revolutions is equivalent to the number of periods of the curve. This information, coupled with information on the wheel diameter can be used to calculate a distance traveled by the wheel. Of course, actual accelerations detected by accelerometers include accelerations detected, for example, from vehicle vibrations, uneven road surfaces, and objects 140 on the road surface that may impact the wheel and impart accelerations to the wheel.

In one embodiment, the vector acceleration of each accelerometer 110 is measured, which in this embodiment with 3-axis accelerometers is $(x_1^2+y_1^2+z_1^2)^{1/2}$ and $(x_2^2+y_2^2+z_2^2)^{1/2}$. This vector acceleration from the accelerometers 110 is low pass filtered to remove higher frequency signals, and is referred to as the acceleration vector passing through the rotational centroid, or centripetal acceleration, which will be referred to as $A_{c1}$ for the first accelerometer, and $A_{c2}$ for the second accelerometer. Let $A_{c2}$ be some $R_k$ distance from $A_{c1}$ which is mounted some unknown distance from the center of rotation. Therefore the angular rate of a device with an unknown offset can be directly measured according to one of:

$$\omega^2 = \frac{|a_{c1} - a_{c2}|}{R_k} \quad (1)$$

$$\omega^2 = \frac{|a_{c1} + a_{c2}|}{R_k} \quad (2)$$

where ω is the angular rate of the device. The particular equation that is used to generate angular rate information can be selected based on information acquired from the counting solution described in U.S. Pat. No. 6,940,940.

In embodiments using more than two accelerometers, the angular rate of the device may be measured using any two of the accelerometers. For example, a system may have three accelerometers, referred to as center, left, and right, the acceleration vector of each referred to as $a_c$, $a_L$, and $a_r$, respectively. The acceleration vector passing through the rotational centroid may be determined based on one of several possible conditions related to the magnitude of the centripetal acceleration of the accelerometers and the location of the accelerometers in relation to the center of rotation of the wheel. Namely, four situations are possible, the first being $a_r > a_L$, $a_c$, and the center accelerometer is located some relatively small distance x from the actual center of rotation of the wheel and is closer to the left accelerometer then the right accelerometer. In this case, $a_r=\omega^2(R_k+x)$; $a_c=\omega^2 x$; and $a_L=\omega^2(R_k-x)$. Therefore, in this case, $\omega^2 R_k=a_r-a_c$, which equals $a_L+a_c$.

The second possible situation is where $a_r>a_L$, $a_c$ and the center accelerometer is located a distance x from the actual center of rotation of the wheel which is larger than the distance $R_k$ between the center accelerometer and each of the left and right accelerometers, the left accelerometer being the closest to the actual center of rotation. In this case, $a_r=\omega^2(R_k+x)$; $a_c=\omega^2 x$; and $a_L=\omega^2(x-R_k)$. Therefore, in this case, $\omega^2 R_k=a_r-a_c$, which equals $a_c-a_k$.

The third situation is where $a_L>a_c$, $a_r$, and the center accelerometer is located some relatively small distance x from the actual center of rotation of the wheel and is closer to the right accelerometer then the right accelerometer. In this case, $a_r=\omega^2(R_k-x)$; $a_c=\omega^2 x$; and $a_L=\omega^2(R_k+x)$. Therefore, in this case, $\omega^2 R_k=a_L-a_c$, which equals $a_r+a_c$.

The final situation is where $a_L>a_c$, $a_r$ and the center accelerometer is located a distance x from the actual center of rotation of the wheel which is larger than the distance $R_k$ between the center accelerometer and each of the left and right accelerometers, the right accelerometer being the closest to the actual center of rotation. In this case, $a_r=\omega^2(x-R_k)$; $a_c=\omega^2 x$; and $a_L=\omega^2(R_k+x)$. Therefore, in this case, $\omega^2 R_k=a_L-a_c$, which equals $a_c-a_r$.

Using these relationships, the magnitude of the sensed accelerations may be used to select the appropriate equations to be used in the calculation of wheel revolutions, which may in turn be used to calculate the distance traveled by the wheel. For example, a voting system is used so that the centripetal equations stand on there own without use of the algorithm described in U.S. Pat. No. 6,940,940 for selection of equations. A multiple accelerometer system having three of more accelerometers will work over a wider centripetal acceleration envelope.

Figure 4:
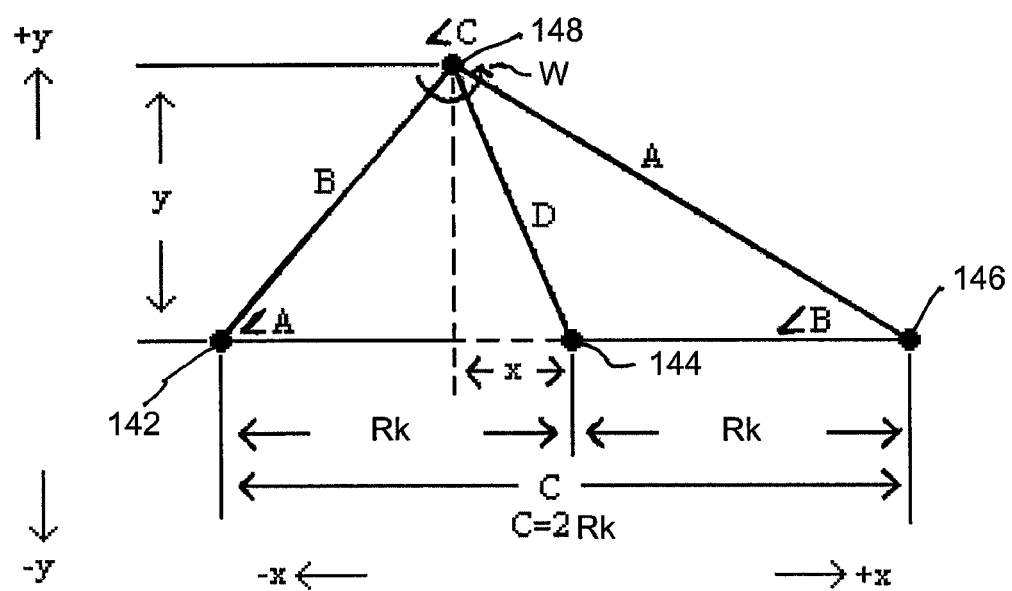
FIG. 4 is an illustration of multiple accelerometers and the determination of angles between the accelerometers and a center of rotation.

With reference now to FIG. 4, an example of the computation of the acceleration measurement of w using multiple accelerometers that are offset in two dimensions is described. In this example, three accelerometers, a left accelerometer 142, a center accelerometer 144, and a right accelerometer 146 are mounted in substantially the same plane and are offset from a center of rotation 148 of a rotating object. Each of the left 142 and right 146 accelerometer are mounted a known distance $R_k$ from the center accelerometer 144. Each accelerometer 142, 144, and 146, output currently sensed accelerations in, for example, three axes. The centripetal acceleration about the center of rotation 148 results in acceleration vectors from each accelerometer creating a ray that crosses through the centroid of acceleration 148. With two or more accelerometers each having two or more axes of acceleration, the distance from the centroid to each accelerometer may be calculated. First, the angle to the centroid is calculated using the relationship $\tan^{-1}(y/x)$ on a low pass filtered signal that removes gravitational effects (such as described above). This yields ∠A and ∠B. Having these two angles allows ∠C to be calculated because the sum of all three angles must be 180 degrees (the sum of the interior angles of a triangle). The distance from the left and right accelerometers is known to be $2R_k$. Using this information, side distances A and B may be solved for using the sine rule for non-right-angle triangles, namely:

$$\frac{A}{\sin(\angle A)} = \frac{C}{\sin(\angle C)} = \frac{B}{\sin(\angle B)}$$

In this case, C is known to be 2Rk, and the sine of angles A, B, and C can be calculated. Therefore, the distances A and B can be calculated. Once A and B are known, ω can be calculated directly according to the relationship $\omega^2 A=|a_r|$ and therefore $$\omega = \sqrt{\frac{a_r}{A}}.$$

Multiple triangles may b used to solve for ω to improve resolution in a slowly rotating environment. In the event that the surface on which the accelerometers are mounted is not perpendicular to the ground, the distance to the centriod and angular change measurements may be performed using similar techniques with measurements related to the accelerometer z-axis measurements.

The accelerations are measured, in an embodiment, with an Analog Devices accelerometer part number ADXL326BCPZ. Mathematical processing, in this embodiment, is performed on a Texas Instruments microcontroller the MSP430F5418 device. A wireless communications system, such as described in U.S. Pat. No. 6,940,940 may be added on based on the CYRF6936 radio transceiver from Cypress Semiconductor.

Referring again to FIG. 1, as mentioned the accelerometers detect force along three axes, an x-axis, a y-axis, and a z-axis, each of the y and z axes being offset from the x-axis by 90 degrees. As the wheel 105 rotates in a direction shown by the arrow 125, the orientation of the x-axis and y-axis will change with respect to the ground 130. Assuming a flat surface, the force of gravity (g) is felt in a direction perpendicular to the ground 130.

Many present day systems encounter problems in counting revolutions if vibration jumps significantly and frequencies vary dramatically very near the rotational rate. Also, if the system rotates very slowly with large amounts of vibration many systems will not count accurately. Finally if an object is subjected to a larger vibration without rotating it can cause the algorithm to lock to a sinusoidal acceleration and begin counting even though a wheel is not rotating. Some of these cases are as follows: if an object is suddenly thrown in the air spinning which involves very near instant acceleration prior systems may declare the rotational acceleration invalid and not count those rotations. In another case, a pumping rig may be shaking the ground around a vehicle but the vehicle is not moving, prior sensor systems may see larger accelerations, lock to them and begin to slowly count. Embodiments of the present disclosure account for these type cases by providing a rough estimate of angular rate that is instantaneously calculated then used as a seed for rotation counting algorithms. This seed allows the system to ignore vibration if no centripetal acceleration delta exists between two points on a surface. The second accelerometer a known distance from the first accelerometer gives these two points.

Systems of several embodiments also have the benefit of compensating for the situation where a hubodometer is not mounted directly in the center of rotation. If a single accelerometer is mounted off the center of rotation, centripetal acceleration will exist in the single accelerometer, but since the distance from the centroid of rotation is unknown in such a case, the centripetal acceleration is a useless variable. However with a second data point, this unknown offset can be ignored and rotational velocity can be directly calculated. This value can then be used to compare a revolution counting algorithm that is already in use, and possibly switch counting algorithms for situations where no rotation exists but vibration does or in cases where rotational velocities are suddenly changed by a large jerk.

In one embodiment, signals from accelerometers are processed in two stages, because at very low rotation rates, such as less than 1.5 revs/sec, the centripetal acceleration is too small to be reliable is the spacing between accelerometers is relatively small. First general motion is detected using an algorithm such as described in U.S. Pat. No. 6,940,940, but revolutions are not counted until 1.5 revs/second has been hit. A low pass filter on a least one of the accelerometers is used to calculate an angle so that at very low speeds of less than 1.5 revs/second the system can count rotations using a simple inverse tangent on the axis $\tan^{-1}(y/x)$. Such a low pass filter must be relatively sharp and not allow impacts and vibration to change the results by more than about 0.2 g's. Once 1.5 revs/second has been hit, the system begins using the outputs of the low pass filters for centripetal acceleration calculations. When the system offsets are subtracted off, the velocity can be directly measured. This velocity is then turned into a time per revolution. This value is then used to set the sample rate of the band pass filter system. For example, is the system is rotating at 10 revs/sec and it is desired to make x samples each revolution then sampling needs to be performed at 10*x samples/second. This sample rate will be somewhat in error since velocity can only be determined to within some accuracy based on temperature drifting and noise. In order for the system to not require extensive calibrations, an embodiment requires that the velocity is known to with +/−5%. With this sample rate fed into the band pass filter system of the hubodometer system, it is able to accurately take an inverse tangent function and to see dynamic angle without seeing vibration or centripetal acceleration. Essentially, centripetal acceleration is low frequency and is filtered out, and vibration is higher frequency and is filtered out. The only signal that then remains is the changing acceleration due to the rotating gravity vectors. When the inverse tangent is calculated in the relatively noise free environment, the exact angle at any point in time can be determined. This angle is then totaled until 360 degrees have passed and a count is added. Since the angle can now be exactly known an exact velocity can then be calculated. This velocity will be somewhat different than the rough velocity obtained from the centripetal system so the sample rate is adjusted to match this new value.

At this point the system has the following variables: (a) at low speed x, y yield angle leading to a count; (b) when 1.5 revs/second are hit the centripetal system begins getting a constant output and then drives a new a/d sample rate based on the output; the controller's bandpass algorithm then locks to the rotating angles and calculates a more exact velocity and adjusts the sample rate accordingly. The system then uses the more exact velocity, unless it deviates by more than +/−12% from the centripetal velocity. If the new calculated exact velocity should suddenly deviate from the rough velocity, such as much slower, it will be boxed in or limited to the rough velocity minus 12% until the system can relock to the rotating gravity vectors and reset the sample rate.

Such a limit box allows the system to be instantaneously accelerated or deaccelerated, since the rough velocity will drive the sample rate until a phase locked loop can be derived by the band pass filters. For example, if the device is suddenly thrown up in the air spinning, the centripetal acceleration sees the sudden velocity jump from, for example, 0 to 12 revs/second and instantly changes the sample rate. The band pass filter system still doesn't see anything because the last outputs it saw were at zero and the new angles suddenly being received are coming in at some much higher rate, so the delay lines need to be shifted for a period of time at the new sample rate before a good vector starts coming out. Then when good vector is available, the band pass filter is adjusted to the rate indicating that the system is actually rotating at 12.83 revs/second instead of the estimated 12 revs/second.

This process is continued any time sudden velocity changes are encountered or extreme vibration is encountered that saturates the accelerometer outputs. In the past, systems relied on the physics of a heavy vehicle model to prevent these loss of lock situations. However, in embodiments described herein, since velocity can be determined directly, such restrictions on vehicle dynamics can be lifted. This means that if the device is even spun horizontally above the earth it will still count with some accuracy. In such a case, the gravity vectors will not be locked to, but the velocity will still be roughly known. The centripetal system will only yield accuracies to within +/−5% but that is good enough to allow the second filter set to directly lock onto angle thus closing the gap.

In such a manner, the end result is a system that can be shook vigorously and not count because centripetal acceleration is zero and a low pass filtered angle is not changing. It can then be waved in a wide circle but it still won't count because all of the centripetal acceleration vectors will be very nearly the same and the low pass filtered angle will only change if the unit happens to be slowly rotated as it is spun. However if the unit should suddenly begin spinning the system will begin counting. On very low rate systems only the low pass angle will be integrated for count allowing for tracked vehicles with slowly turn but encounter high vibrations to still be counted accurately.

Mileage is equivalent to the wheel revolution count multiplied by the circumference of the wheel. Velocity and acceleration are calculated from the accelerometer output coupled with a timer, such as a clock incorporated in to the microcontroller. Velocity is calculated by dividing the mileage by time. Thus, velocity is proportional to the period of the rotation. Acceleration is measured by the change in the period of the rotation. Thus, a constant rotational period indicates a constant velocity, while changes in the period are representative of acceleration.

In another embodiment, one or more gyroscopes may be employed in a rotational sensor. Use of a gyroscope can expand the situations where useful information related to system motion may be obtained. For example, in certain cases, circular motion on a device may be present, and detecting rotation errors caused by circular motion in standard accelerometer systems may be challenging. Rotation of the sensor about the center of rotation, such as a wheel rotating about a center, is referred to with reference to angles $\theta$. Movement of the sensor in circular motion, such as a vehicle turning or moving in a circular path, is referred to with reference to angles $\phi$. In one exemplary accelerometer system, rotational motion is accompanied by an offset which follows the equations (for a two accelerometer system) of $a_r[r+k(\cos \phi)]\omega^2$; and $a_L[r+k(\cos(\phi+180))]\omega^2$. In circular motion cases, $\angle \phi$ rotates relative to $\angle \theta$ as the circular motion progresses, making $\Delta r$ (right accelerometer) and $\Delta L$ change or fluctuate as the change distance from the origin, and $\angle \phi$ rotates as it moves around the centroid of motion. In this case, $a_r[r+k(\cos(\theta+\phi))]\omega^2$ and $a_L[r+k(\cos(\theta+\phi+180))]\omega^2$. For angular rates above a lower threshold, centripetal acceleration is sufficiently stable so that the $\angle a_L+a_r$ to the origin can be easily calculated. The frequency is dependent on the distance $R_k$ between accelerometers. For frequencies below the low frequency threshold, the angle to the centroid is not discernable without some additional insight. In such cases, a gyroscope may be used to detect the change in angle relative to the centroid. In such a case, angular information from the gyroscope may be provided to the controller and used to calculate, for example, distance traveled by a wheel.

Referring to FIG. 4, the circuit board comprises a controller, which in an embodiment of the present invention comprises a microprocessor or microcontroller 170 having internal read-only memory (ROM) 174 and random access memory (RAM) 176. The ROM 174 stores the operating program including the impact adjustment program and any communications programs, as well as other accelerometer and odometer data. The RAM 176 is employed as a temporary "operating" memory wherein accelerometer readings and other odometer data is stored. Additionally, a permanent memory (not shown) is provided to backup data and prevent loss in the event of a power failure. In a preferred embodiment of the present invention, the microcontroller comprises an ultra-low-power microcontroller, for example, part number MSP430F133, manufactured by Texas Instruments Incorporated, Dallas, Tex.

The microcontroller performs signal-conditioning functions 172 to convert the incoming accelerometer signals into a machine friendly format, preferably a digital signal. Once the signal is digitized, it is electronically manipulated as described. In one embodiment of the present invention, the digital filtering 178 is performed by an adaptive frequency filter. This digital filter allows the electronic hubodometer to accurately measure wheel rotation under a vast array of road conditions.

In a further embodiment, a display 190 is mounted on the front face of the hubodometer and operates in communication with the microcontroller 170. The display 190 may comprise a display device such as a light emitting diode (LED), liquid crystal display (LCD) or other such low-power display. The microcontroller operates the display to make odometer readings and other data visually available to an observer. In one embodiment, the microcontroller enables the display to be visible only when the wheel is stationary. When the wheel is rotating and rotations are being sensed, the display is turned off to conserve power and further battery life. When the wheel is stationary, accelerometer readings indicate lack of rotation as well as orientation of the wheel. Since the hubodometer housing and display are fixed relative to the wheel, an inverted data signal also indicates the display is inverted. The microcontroller then inverts the data on the display such that it is oriented correctly and easily viewed by an observer.

In a further embodiment, the system further comprises a power supply 180 to provide power to the accelerometer 150, microcontroller 170, display 190, and the various communication means 192, 195. Preferably, the battery is a high capacity, long life battery such as a lithium battery, that provides several years of operating power for the electronic components.

Battery life is further extended through efficient operation of the system by the microcontroller. When the wheel is rotating at a constant rate, the sample rate can be decreased to reduce power consumption because the data between samples is easily reconcilable. When the wheel is accelerating or decelerating, the sample rate is increased to more accurately track the changes in wheel speed. In a preferred embodiment of the present invention, as discussed above, the system is phase locked to the wheel speed. Thus, the accelerometer is turned on at a sample rate proportional to the wheel speed and/or acceleration. The system samples accelerometer data and interpolates between data points, similarly to the reconstruction of data during blindness. In doing so, the system reduces the overall power consumption while maintaining appropriate accuracy of the data.

When the system detects no change in the wheel's angular position, indicating the wheel has stopped, the display is turned on. Additionally, when the wheel stops, the system drops the sample rate of the accelerometer such that only occasional readings are taken while the vehicle is motionless. These adaptive power control techniques allow the system to use power less than one percent of the time over the life of the battery. This allows a small battery to last for extended periods of time, in some cases 10 years or more depending on the type of battery used.

In a further aspect of the present invention, a communication system is provided to communicate odometer information to a location remote from the wheel and allow the odometer to be programmed, calibrated, or otherwise controlled. The two preferred communication systems for use in the present invention include an infrared system and an RF communication system.

In a further embodiment of the present invention, the communication system comprises an infrared (IR) communication system. The IR communication system is in communication with the microcontroller and accessed through the display means. In a preferred embodiment of the present invention, the IR communication system is built into the microcontroller 170. An infrared LED and photosensor comprise the IR interface 192 and are incorporated into the display means 190, or otherwise mounted on the external surface of the hubodometer. IR communication systems have been used with hub-mounted odometers extensively. An example of such a system is found in U.S. Pat. No. 4,697,278 to Fleischer, hereby incorporated by reference in full.

In a further aspect of the present invention, hubodometer data is transmitted to a remote location through an RF communication system. Typically, such a system includes an interrogator at the remote location that generates a modulated or unmodulated radio frequency interrogation signal, and an RF "tag" incorporated into the hubodometer to receive the signal from the interrogator and communicate hubodometer data back to the interrogator.

The RF tag is activated when an RF signal is transmitted or broadcast from the interrogator and impinges the antenna on the tag. This signals the tag to activate. Electronic controls on the tag receive odometer information and communicate this information back to the interrogator by modulating the antenna on the tag according to a predetermined format. As additional RF energy from the interrogator impinges the antenna on the tag, a portion of that energy will be reflected back to the interrogator. The reflected energy will vary in form due to modulations in the antenna. The interrogator receives this reflected energy containing modulations from the tag's antenna and deciphers the modulations to extract odometer information.

This modulation of reflected RF energy is commonly known as RF backscatter communication. There are two types of radio frequency identification (RFID) devices that use RF backscatter methods: passive and semi-passive. There is a further method of RF communication known as active RFID wherein the tag comprises a transceiver capable of both receiving RF signals from the interrogator and actively transmitting RF signals back. Active-RFID has a greater broadcast range because the tag is generating and transmitting an active signal. However, active-RFID uses significantly more power and is less suitable for low-power battery operated systems.

Passive RF tags work by receiving energy from an interrogator and using the energy to power the electronic components on the tag. There is no battery or power source physically connected to the tag. The only power the tag receives is in the form of RF energy from the interrogator. Once the tag has absorbed enough energy to power the electronics, the tag communicates information to the interrogator by modulating its antenna characteristics to reflect energy back to the interrogator in a meaningful manner.

Passive RF tags operate inductively or through a direct electric field. The most common are inductive RF tags, which typically operate at a frequency of 13.25 MHz. Newer RF tags have been operating at higher frequencies that allow them to become capacitive in nature and take advantage of far field effects. These newer tags can operate at 915 MHz or 2.45 GHz; however, their typical range is still limited to about 3 meters.

Semi-passive RF systems comprise a tag connected to a power source such as a battery to provide power to the onboard electronics. It is important to note that in a semi-passive system the battery is not used to transmit a signal, but rather, only to operate the electrical systems on the RF tag. Since the battery powers the onboard circuitry, the interrogator only has to send enough power to alert the RF tag and provide RF energy for the backscatter communication. This greatly improves the range of the system because in the passive RF tag scenario described above, the onboard electronics use most of the power to run the electronics on the tag leaving little to be reflected back to the interrogator. Semi-passive systems generally operate in the 900 MHz and 2.45 GHz bands and have an operational range of over 100 meters in some applications. A preferred embodiment of the present invention comprises a semi-passive RF communication system.

Figure 5:
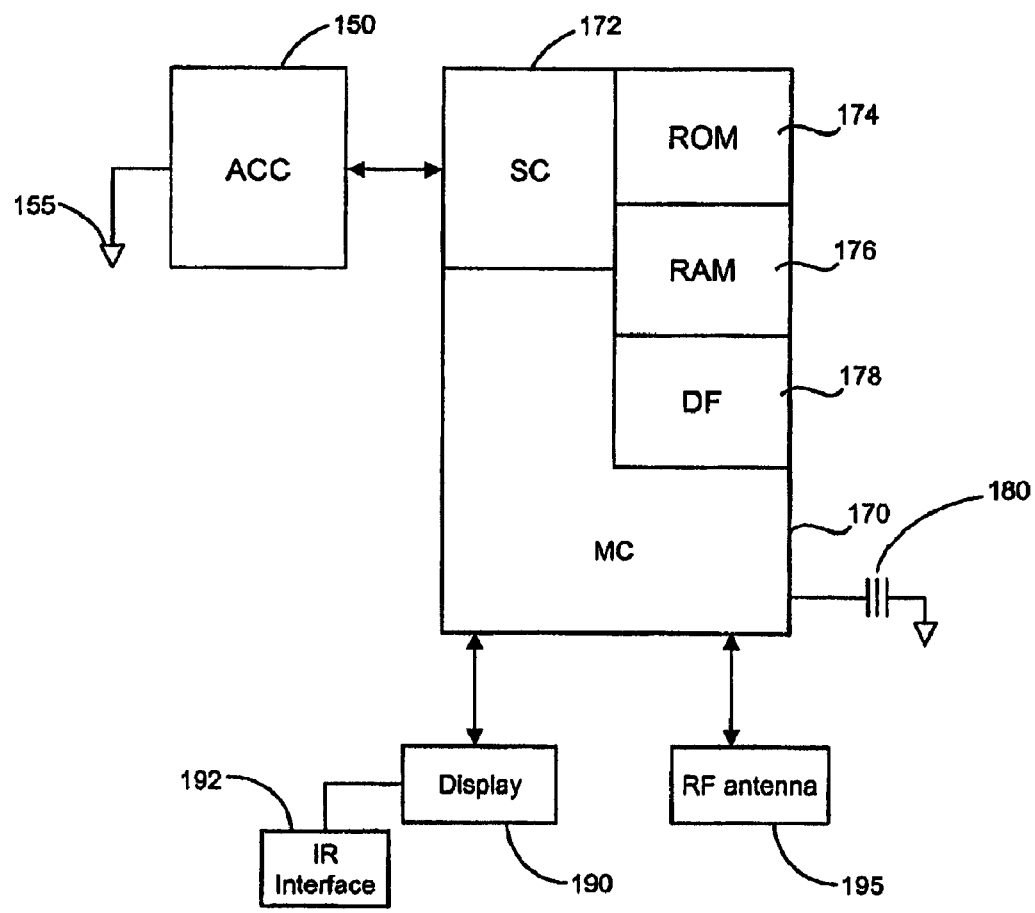
FIG. 5 is a functional block diagram of the electronic components of an embodiment.
Figure 6:
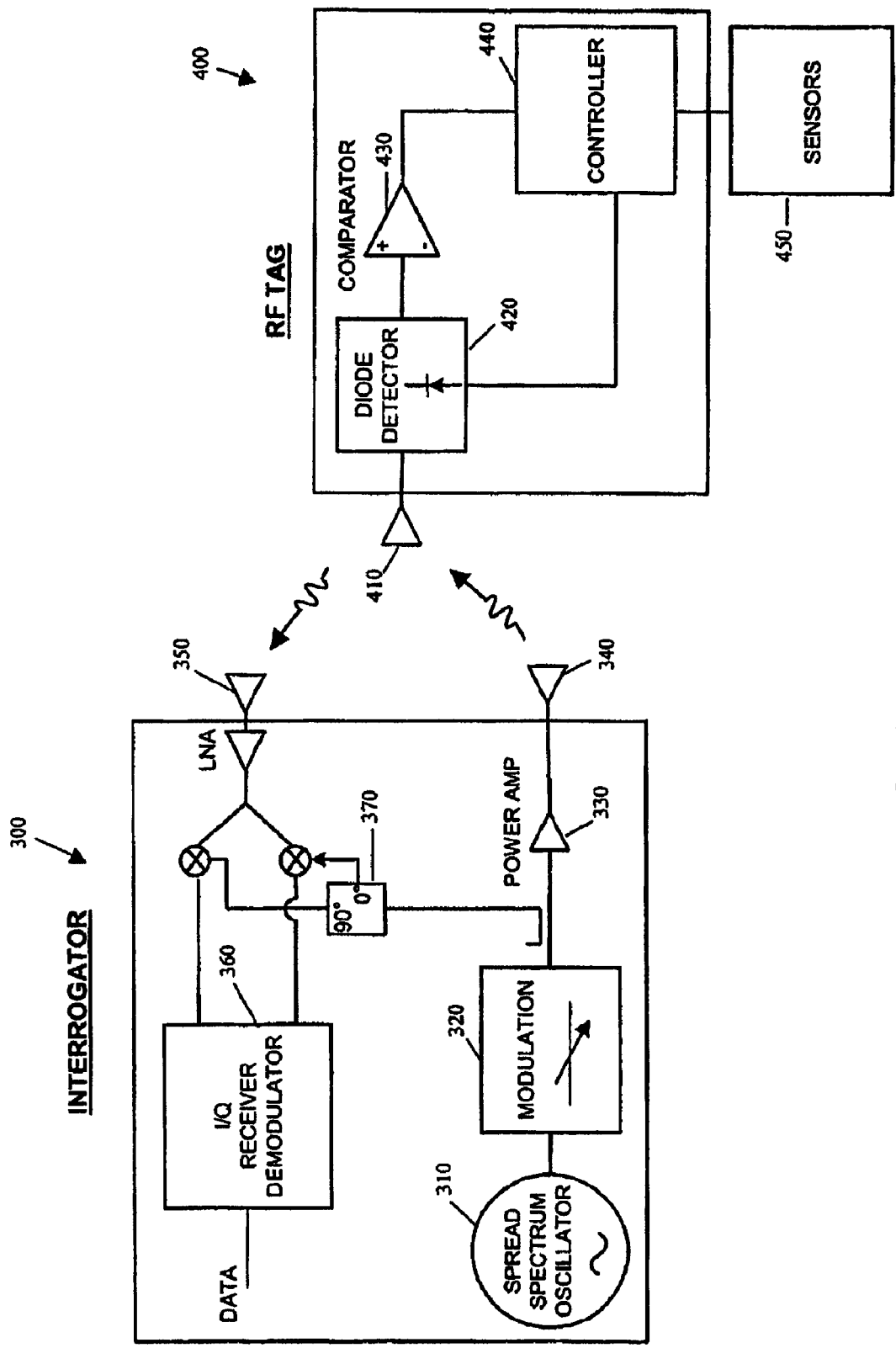
FIG. 6 is a functional block diagram of an RF backscatter communication system used in an embodiment.

A typical interrogator 300 and tag 400 used in RFID systems of the present invention can be viewed in FIG. 5. The interrogator 300 comprises an oscillator 310 generates a signal at a frequency within the operating band of the RF tag 400. The signal is modulated by a frequency modulator 320 to encode instructions and otherwise communicate with the RF tag 400. In a preferred embodiment of the present invention, a simple modulation scheme is used to decrease the cost of the system. The most preferred modulation scheme is bi-phase modulation. However, other modulation schemes may be used in conjunction with the present invention. After modulation, the signal is split. One part of the signal is amplified in a power amplifier 330 and broadcast through an antenna 340. The other piece of the signal is sent to the demodulator 360 on the receive side of the interrogator.

The semi-passive RF tag 400 comprises an antenna 410, tuned to absorb energy in a predetermined band, diode detector 420 which rectifies the signal, turning the radio signal into a voltage, and comparator 430 that compares the voltage from the diode detector 420 to a set voltage or activation voltage. A battery (not shown) powers these electronic components thereby eliminating the need to receive and store power from the interrogator for the purposes of operating the on board electronics.

When the proper activation voltage is received by the RF tag, indicating that the interrogator is broadcasting a request for information, the comparator 430 signals the microcontroller 440 which times how long the energy impinges the antenna 410 and when it stops. The microcontroller 440 uses this data to determine the modulation of the signal and decoding the information sent from the interrogator. The tag then receives odometer information 450 for communication to the interrogator.

Once the interrogator 300 transmits the modulated command, the modulator 320 in the interrogator turns off and the interrogator 300 broadcasts unmodulated energy to the RF tag 400. The RF tag 400 uses this unmodulated signal to communicate back to the interrogator 300.

While the RF tag has been described as a separate system that receives odometer information from the odometer's microcontroller, it is within the scope of the present invention to incorporate the electronic controls of the RF tag into the microcontroller of the odometer. Further, in embodiments of the present invention comprising an RF communication system separate from the odometer system, the power source operating the accelerometer and odometer circuitry may be employed to operate the electronics of the RF tag.

The interrogator of the RF communication system is positioned proximate to the vehicle within range of the backscatter RF signal. Such locations may include the passenger compartment of the vehicle on which the odometer is mounted, a portable hand-held device, or the control center of a storage or maintenance yard where vehicles are kept.

In a still further embodiment of the present invention, information from the odometer is communicated from the interrogator to a wireless network such as a cellular or satellite network. In this embodiment, the interrogator is in communication with a network interface that allows the information to be further communicated throughout network. This would allow an observer to monitor information being communicated by the odometers. For example, a user at a central monitoring station would be able to monitor odometer readings for a vehicle or fleet of vehicles while the vehicles are dispersed along their routes.

Though the RF communication system as described herein has a limited operational range, once the information is transmitted to the network, that network will provide the necessary communication to any location in the world with such network capabilities. In a preferred embodiment of the present invention, the network comprises the Internet. Once this information is available through the Internet, it is accessible from almost any location through hand held wireless devices such as Personal Digital Assistants or laptop computers.

Although the present invention has been described with reference to particular embodiments, it should be recognized that these embodiments are merely illustrative of the principles of the present invention. Those of ordinary skill in the art will appreciate that the apparatus, system and methods of the present invention may be constructed and implemented in other ways and embodiments. Accordingly, the description herein should not be read as limiting the present invention, as other embodiments also fall within the scope of the present invention.

What is claimed is:

1. A wheel-hub mountable odometer comprising:
   a housing that is adapted that be coupled to a wheel of a vehicle;
   at least a first, accelerometer and a second accelerometer mounted within said housing that each sense a force acting thereon and generate an electrical signal representative of said sensed force, said first accelerometer mounted at a first distance from said second accelerometer, each of the first and second accelerometers, when said housing is coupled to a vehicle wheel, being an unknown distance away from the center of rotation of the vehicle wheel;
   a controller mounted within said housing that is interconnected to said accelerometers that (i) receives electrical signals representative of said sensed forces acting on each accelerometer, (ii) calculates distances between said accelerometers and the center of rotation based on the electrical signals and said first distance, and (iii) calculates wheel rotations based on the electrical signals and said calculated distances; and a power source mounted within said housing that provides operating power to said accelerometers and said controller.

2. The odometer of claim 1 wherein each accelerometer comprises a dual axis accelerometer capable of sensing force along two axes.

3. The odometer of claim 1 wherein each accelerometer comprises a three axis accelerometer capable of sensing force along three axes.

4. The odometer of claim 1 wherein said first distance and sensed forces are processed by said controller to determine centripetal acceleration that is used to calculate wheel rotations.

5. The odometer of claim 4 wherein the controller calculates angular rate of change based on the centripetal acceleration.

6. The odometer of claim 5, wherein said controller comprises electronic filters that include (i) an adaptive frequency filter that removes centripetal acceleration signals outside of an adaptive frequency range that is calculated through the use of a digital phase locked loop, and a bandpass filter attenuates irregularities in the calculated centripetal acceleration signal due to wheel impacts.

7. The odometer of claim 1 wherein said odometer further comprises a display in communication with said controller.

8. An odometer communications system comprising the odometer of claim 1 coupled to a communication system operable to communicate odometer information to a remote location.

9. The odometer communications system of claim 8 wherein the communication system comprises an RF communication system.

10. The odometer communications system of claim 9 wherein the RF communication system comprises an RF tag in communication with the controller of the odometer that transmits information related to wheel revolutions when a signal is received from an interrogator remote from said odometer.

11. A method for counting wheel revolutions comprising:
attaching an electronic odometer to a wheel, the odometer comprising (i) at least two accelerometers mounted a known distance apart and each mounted an unknown distance from a center of rotation of the wheel, and (ii) a controller that receives signals from said accelerometers, the signals proportional to a sensed force acting on said accelerometers,
calculating distances between said accelerometers and the center of rotation;
converting said accelerometer signals and distances into centripetal acceleration;
calculating an angular rate of change based on said centripetal acceleration; and
calculating a wheel revolution count based on said angular rate of change.

12. The method of claim 11 wherein the accelerometers comprise dual axis electronic accelerometers that sense force along the two axes and generate electrical signals proportional to the sensed forces.

13. The method of claim 11 wherein the accelerometers comprise three-axis electronic accelerometers that sense force along the three axes and generate electrical signals proportional to the sensed forces.

14. The method of claim 11, wherein said calculating distances comprises:
receiving, at said controller, signals from each accelerometer;
filtering out gravitational effects from said signals;
calculating an angle between each accelerometer and the center of rotation based on the filtered signals; and
calculating, for each accelerometer, a distance between the accelerometer and the center of rotation based on the calculated angles.

15. The method of claim 14, wherein said filtering comprises setting a frequency of an adaptive frequency filter based on said angular rate of change.

16. The odometer of claim 14, wherein said filtering comprises filtering out irregularities in the centripetal acceleration signal though a bandpass filter.

17. The method of claim 11, further comprising:
transmitting wheel revolution count information to a system remote from said odometer through an RF communication system interconnected to said controller.

* * * * *